Patented June 15, 1954

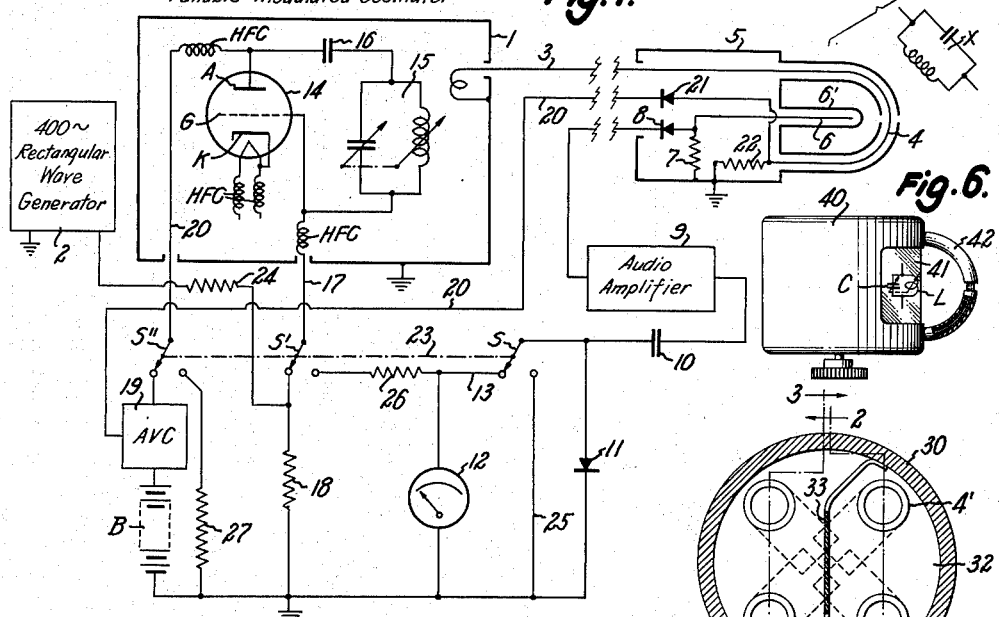
June 15, 1954  H. A. WHEELER  2,681,434
FREQUENCY METER
Filed March 7, 1951
INVENTOR:
Harold A. Wheeler,
BY Pierce, Scheffler + Parker,
ATTORNEYS.

2,681,434

UNITED STATES PATENT OFFICE 2,681,434

FREQUENCY METER

Harold A. Wheeler, Great Neck, N. Y., assignor to Boonton Radio Corporation, Boonton, N. J., a corporation of New Jersey Application March 7, 1951, Serial No. 214,321

8 Claims. (Cl. 324—81)

The invention relates to frequency meters which operate as either a detecting wavemeter or a heterodyne wavemeter to locate resonances in either active or passive circuits, and more particularly to meters for use at frequencies substantially higher than those at which known types of measuring equipment are operable.

The so-called "grid-dip meter" comprises a tunable oscillator with an indicating instrument in the grid circuit, and the resonant frequency of an external circuit is determined by tuning the oscillator over its operating range and noting the oscillator frequency at which there is a sharp decrease in the grid current. The grid-dip meter becomes erratic at frequencies above about 200 megacycles when the separation of the oscillator from the unknown external circuit becomes a substantial fraction of the wavelength. In general, a grid-dip meter is reliable only for frequencies at which the "round trip" distance from the oscillator to the external circuit and back to the oscillator, i. e. twice the separation of the oscillator from the external circuit, is less than one-sixteenth the wavelength. At 400 megacycles for example, the grid-dip meter should be brought to within something less than 1 inch from the unknown circuit to obtain a reliable indication of the resonant frequency of that circuit but it is frequently impossible to obtain this close positioning when the unknown circuit is in close proximity to other elements.

Objects of the invention are to provide frequency meters which are stable in operation at frequencies of as high as about 1000 megacycles. An object is to provide a frequency meter which includes a tunable modulated oscillator, a loop or other radiator, a receiver loop decoupled from the radiator, and a high-gain detector-amplifier having an output meter for measuring the amplitude of the signal reradiated to the receiver loop from the external circuit. An object is to provide a frequency meter including elements as above stated, and in which the radiator and receiver loops are crossed loops at the end of a probe. An object is to provide frequency meters including an amplitude controlled modulated oscillator tunable over a range of high and ultra-high frequencies, and a high-gain detector-amplifier including an output meter for measuring the signal energy reradiated from an external circuit. A further object is to provide a frequency meter including a modulated oscillator tunable over a range of high and ultra-high frequencies, a detector-amplifier having an output meter for measuring the signal energy reradiated from an external passive circuit, and switches for converting the oscillator to a detector and for coupling the detector to the output meter to measure the resonant frequency of an active external circuit.

These and other objects and advantages of the invention will be apparent from the following specification when taken with the accompanying drawings, in which:

Fig. 1 is a somewhat schematic diagram of a frequency meter embodying the invention;

Figs. 2 and 3 are longitudinal sections through the probe assembly on lines 2—2 and 3—3 of Fig. 4, respectively, but with the Fig. 3 section turned through 180°;

Fig. 4 is a transverse section through the probe housing prior to the mounting of the electrical elements of the probe assembly;

Fig. 5 is a fragmentary sectional view of the end of the probe to show the terminal end of the receiver loop; and Fig. 6 is an elevation of the tunable oscillator-probe assembly of another embodiment of the invention.

In Fig. 1 of the drawings, the reference numeral 1 identifies generically an oscillator which is tunable over a range or ranges of frequencies extending, for example, up to 1000 megacycles, and which is modulated at an audio frequency, say 400 cycles per second, by a 100% rectangular wave modulation generator 2 of 30% duty cycle. The modulated signal output is transmitted by a cable connection 3 to a radiator loop 4 at the outer end of a probe assembly 5 which may be brought into proximity to an external circuit X. The cable lead 3 is of coaxial conductor type with the outer conductor grounded on the oscillator chassis and the probe 5 but, for simplicity of illustration, it and other coaxial cable connections are shown as single leads. The radiator loop is within an outer cylindrical conductor 4' which is grounded on the probe 5 and has a gap at its central point. A receiver loop 6 within a similar outer conductor 6' with a gap at its center point is mounted on the probe at right angles to, and therefore decoupled from, the radiator loop 4.

Signal energy reradiated from the unknown external circuit X to the receiver loop 6 is developed across a resistor 7 and demodulated by a rectifier 8 to develop a current of the modulation frequency. This current is amplified in audio amplifier 9 and transmitted through a coupling condenser 10 to a detector 11, the resulting pulsating direct current being measured by a sensitive direct current measuring instrument 12, when, as illustrated in Fig. 1, the instrument is shunted across the detector 11 by a lead 13.

The method of operation of the apparatus, as so far described, is as follows: The probe 5 and its loops are brought into proximity to the circuit X of unknown resonant frequency. The oscillator 1 is tuned over its frequency range and the resonant frequency of the external circuit is equal to that frequency of the tuned oscillator which develops a maximum current indication at the instrument 12. This method is appropriate when the external circuit is passive. The invention also provides means, as described hereinafter, for measuring the frequency of an oscillatory current developed across the external circuit X.

The oscillator 1 includes a tube 14, preferably a type 5675 pencil tube for measurement of resonant frequencies of the order of 1000 megacycles, and a tuned circuit 15 of semibutterfly type and including manually adjustable means, not shown, to condition the tube for oscillation over a plurality of overlapping bands in the frequency range of from about 200 to 1000 megacycles. The tunable circuit 15 is connected between the grid G and anode A of the tube 14 through a coupling condenser 16, and conventional high-frequency chokes HFC are included in the energizing leads to the respective tube elements. The grid G is returned to ground through a lead 17 and a grid leak resistor 18. The signal output of the oscillator is maintained substantially constant over the tuning range, and independent of reaction from the external circuit, by an automatic volume control unit 19, for example a current-regulating tube in the lead 20 connecting the anode A of tube 14 to a potential source B, the AVC being controlled by the current output of a detector 21 in series with the grounded terminating resistor 22 of the radiator loop 4.

The frequency measuring circuit includes switch means to adapt the apparatus for measurement of the oscillatory frequency of an active external circuit. As shown in Fig. 1, the blades S, S' and S'' of three double throw switches are included in the leads 13, 17 and 20 respectively. The switch blades are ganged for simultaneous adjustment, as indicated by the broken line 23, between two sets of fixed contact points. The previously described circuits are established when the switches are adjusted, as illustrated in Fig. 1, to engage the left-hand set of contact points. It is to be noted that the automatic volume control unit 19 is located between the anode voltage source B and the switch S'', and that the modulation voltage from generator 2 is applied to the grid G through a resistor 24 which is connected to the grid return lead 17 between the switch S' and the grid resistor 18.

The second contact point of switch S is grounded by a lead 25, the corresponding contact point of switch S' is connected to the instrument 12 through a resistor 26, and the corresponding contact point of switch S'' is grounded through a resistor 27 to prevent the tube anode from acquiring a static charge when the switches are adjusted into right-hand position for determining the frequency of a current in an active circuit. When so adjusted, the modulating voltage is removed from the grid G, the energizing potential is removed from the anode A, and the tube 14 functions as a diode to rectify the signal input to the loop 4 from an external active circuit X. The rectified current flows through the instrument 12, and the resonant frequency of the current in the external circuit is indicated by the tuning adjustment of the circuit 15 which develops a maximum instrument reading.

The loops 4 and 6 preferably have a length of the order of a quarter-wavelength of the highest frequency at which measurements are to be made. It is not essential but it is deemed advantageous to locate the radiator loop 4 outside of the receiver loop 6.

A major advantage of the described frequency meter over the grid-dip meters is that the phase relation of the radiated and reflected signals has no effect upon the accuracy of the frequency measurements when, as is preferred, the apparatus includes an automatic volume control system 19 for maintaining a substantially constant signal output level. Automatic volume control of the oscillator output is not possible in the grid-dip meter as it would mask the grid current decrease which affords the indication of resonance. The probe 5 and its loops 4, 6 are of small size and can be located in close proximity to an external circuit to afford close coupling which increases the sensitivity of the apparatus and the accuracy of the frequency indications. The loops 4, 6 may be brought into substantial contact with the external circuit X without producing false or erratic indications of resonant frequency since the instrument 12 measures the amplitude of the signal energy reradiated from the external circuit and this measurement is not affected by the phase displacement of the radiated and reradiated signals.

A physical construction for the probe 5 and loops 4, 6 which has proved to be quite satisfactory in actual operation is illustrated in Figs. 2 to 5. The body of the probe 5 is a brass shell 30 having an inner end 31 with a central opening through which the cable connections extend. The outer end of the shell is closed by a threaded metal cap 32 which, either directly or indirectly, supports the loops 4, 6 and all associated circuit elements. The size of the probe is not critical but, in the illustrated embodiment, the diameter of the shell 30 was one inch and the length was about two inches.

The ends of the outer conductors 4', 6' of the loops extend through and are soldered or brazed to the end cap 32 of the probe. A shielding plate 33 is secured to the end cap 32 and extends approximately diametrically across the interior of the shell 30 when the end cap is in place, the edges of the plate 33 being slotted and bent over to provide resilient fingers for grounding engagement with the wall of the shell 30. The transmitter and receiver sections of the probe are shielded from each other by the plate 33 and the several cables which are shown by single lines in the Fig. 1 circuit diagram are flexible coaxial cables with grounded outer conductors. The coupling circuits to the loops 4 and 6 are preferably non-resonant to cover a wide band, and the terminating resistances 7 and 22 impart to the receiver and transmitter loops respectively the characteristics of 50 ohm coaxial lines.

The outer braided conductor 3' is preferably stripped back from the end of the inner conductor 3 and its flexible insulating sleeve 34, and this insulated end portion of the coaxial cable is pushed through the tubular conductor 4' to constitute the radiator loop 4. The outer end of the flexible braid conductor 3' is then telescoped over and soldered to the end of the outer conductor 4'.

The receiver loop 6 is similarly insulated from the outer conductor 6' by a sleeve 35, and is connected to the end cap 32 through the terminating resistor 7. The crystal detector 8 is bypassed to ground through a button type condenser 36 and the central conductor 37 of a coaxial cable extends from the detector 8 to the amplifier 9, the outer conductor 37' of the cable being grounded upon the plate 33. The low voltage end of the receiver loop 6 is grounded upon the end cap 32 or, as illustrated, upon the outer conductor 6' beyond the central gap.

The terminal resistance 22 of the transmitter loop 4 is grounded upon the end cap 32, and the detector 21 of the automatic volume control system is connected to a bypass condenser 38 which is grounded upon the plate 33 and to the central conductor 20 of the coaxial cable connection to the automatic volume control unit 19 of the oscillator circuit.

The described probe is of advantage but is not essential as the apparatus for frequency measurements may be of the general form of the prior "grid-dip" meters in which the probe element or receptor is mounted directly upon the oscillator housing. As shown somewhat schematically in Fig. 6, the tunable oscillator is within a shielding housing 40 which has a window opening 41 for the radiation of high frequency energy from the tuned oscillator tank circuit LC, and a receiver loop 42 is mounted on the housing at right angles to, and therefore decoupled from, the inductance L of the tuned circuit. The power for energizing the oscillator may be derived from the conventional 110 volt, 60 cycle light and power circuit or, for full portability of the frequency measuring apparatus, from miniature batteries, within a separate housing, not shown, and connected by conventional flexible coaxial cables to the elements within the oscillator housing 42. The receiver detector and amplifier, the measuring circuit and preferably an automatic control for the output level are associated with the receiver loop in the manner above described with respect to the probe type embodiment of the invention which is illustrated in Fig. 1.

The embodiments which include a crossed-loop probe are presently preferred at least for frequency measurements in the higher ranges. Tests of the described apparatus have demonstrated that it successfully performs in frequency ranges far higher than those in which any prior frequency measuring equipment affords even relatively accurate measurements. Definite and unmistakable indications of resonant frequency are had at frequencies so high that the probe can not be brought closer to the unknown circuit than about one-quarter wavelength of the frequency to be measured. The prior grid-dip meter is substantially inoperative under such conditions and its utility has been limited to measurements in frequency ranges at which the separation of the oscillator from the unknown circuit has been of the order of less than one-thirtieth of the wave length. The erratic "hill and dale" variation of the oscillator output of the grid-dip meter under adverse measuring conditions is completely eliminated when the automatic volume control of the oscillator output is employed.

In particular, the invention provides entirely practical apparatus for the measurement of the resonant frequency of an unknown circuit mounted on a chassis which itself reflects signal energy back to the receiver loop. This reflected energy constitutes "noise" in the receiver circuit, and the amplifier 9 should be designed for high-gain low-noise operation. To prevent overloading of the measuring instrument, the amplifier preferably includes a delayed automatic volume control to limit the current output of the amplifier.

It is to be noted that the rectangular modulation of the oscillator output with a 30% duty cycle decreases the average power demand on the oscillator tube which, as above stated, is preferably a type 5675 pencil triode. A high plate-power input is essential for oscillation at about 1000 megacycles but the 30% duty cycle of the modulation voltage decreases the average power and eliminates the requirement for special cooling of the tube when located, as is desirable, in a shielded oscillator housing of minimum size.

It is to be understood that the invention is not limited to the particular apparatus as herein illustrated and described, and that various modifications which may occur to those familiar with the design and construction of electronic measuring apparatus fall within the spirit and scope of the invention as set forth in the following claims.

I claim:

1. In apparatus for measuring the resonant frequency of an external circuit, the combination of an oscillator, means for tuning the oscillator over a range of high and ultra-high frequencies, means for imposing a substantially fixed magnitude audio frequency modulation upon the oscillator output, a receiver loop decoupled from said oscillator for receiving energy reradiated from the external circuit, the receiver loop having a length of the order of a quarter wavelength at the highest frequency to be measured, and means operative continuously throughout actuation of said tuning means to tune said oscillator for measuring the magnitude of the energy reradiated to said receiver loop from the external circuit.

2. In apparatus as recited in claim 1, the combination which includes means for automatically controlling the oscillator to develop a substantially constant level of the modulated signal energy radiated therefrom.

3. In apparatus as recited in claim 1, the combination in which said means for imposing a modulation upon the oscillator includes a rectangular wave generator.

4. In apparatus as recited in claim 1, the combination in which said means for imposing a modulation upon the oscillator includes a rectangular wave generator of less than 50% duty cycle.

5. In apparatus for measuring the resonant frequency of an external circuit, the invention as recited in claim 1, in combination with a probe including a radiating loop, said receiver loop being supported on said probe and decoupled from said radiating loop.

6. The invention as recited in claim 5, wherein said means for measuring the energy re-radiated from said external circuit includes means in said probe for demodulating the received reradiated energy, and means for amplifying the demodulated energy to develop an amplified signal of the modulation frequency imposed upon said oscillator.

7. The invention as recited in claim 6, wherein said measuring means includes rectifier means for developing a pulsating direct current voltage from the modulation frequency output of said amplifying means, and a current measuring instrument responsive to the pulsating direct current output of said rectifier means.

8. The invention as recited in claim 1, wherein said oscillator includes an electronic tube having as elements thereof a grid and a plate electrode cooperating with a cathode, a tunable circuit connected to said tube elements, and means for imposing energizing potentials upon the tube elements; in combination with switch means operable to remove an energizing potential from a tube electrode and to connect said tunable circuit to said measuring means through said tube, thereby to condition the apparatus for measurement of the resonant frequency of an active external circuit.

References Cited in the file of this patent

UNITED STATES PATENTS

| Number | Name | Date |
|---|---|---|
| 1,647,349 | Friis | Nov. 1, 1927 |
| 2,242,874 | Usselman | May 20, 1941 |
| 2,380,791 | Rosencrans | July 31, 1945 |
| 2,422,134 | Sanders | June 10, 1947 |
| 2,444,041 | Harrison | June 29, 1948 |
| 2,523,254 | Talpey | Sept. 19, 1950 |